US012811919B2

(12) United States Patent
Hadad et al.

(10) Patent No.: US 12,811,919 B2
(45) Date of Patent: Nov. 24, 2026

(54) MACHINE LEARNING MODEL DEPLOYED TO AN ENCRYPTED COMPUTATIONAL GRAPH

(71) Applicant: Microsoft Technology Licensing, LLC, Redmond, WA (US)

(72) Inventors: Netanel Hadad, Lod (IL); Orr Srour, Ramat-Hasharon (IL); Nadav Shlomo Ben-Amram, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 99 days.

(21) Appl. No.: 18/660,366

(22) Filed: May 10, 2024

(65) Prior Publication Data

US 2025/0350584 A1 Nov. 13, 2025

(51) Int. Cl.
*H04L 9/40* (2022.01)

(52) U.S. Cl.
CPC ................................ *H04L 63/0428* (2013.01)

(58) Field of Classification Search
CPC .................................................. H04L 63/0428
See application file for complete search history.

(56) References Cited

U.S. PATENT DOCUMENTS

2022/0156591 A1* 5/2022 Li ........................... G06F 18/22
2023/0394324 A1* 12/2023 Gu ........................... G06N 3/09

FOREIGN PATENT DOCUMENTS

WO 2024000571 A1 1/2024

OTHER PUBLICATIONS

Brossard, et al., "Private Delegated Computations Using Strong Isolation", IEEE Transactions on Emerging Topics in Computing, vol. 12, Issue No. 01, 2024, pp. 386-398.

International Search Report and Written Opinion received for PCT Application No. PCT/US2025/016946, mailed on Jun. 16, 2025, 14 pages.

Li, et al., "ENIGMA: Low-Latency and Privacy-Preserving Edge Inference on Heterogeneous Neural Network Accelerators", 2022 IEEE 42nd International Conference on Distributed Computing Systems (ICDCS), Jul. 10, 2022, pp. 458-469.

"Trusted execution environment", accessed on link https://en.wikipedia.org/wiki/Trusted_execution_environment, Mar. 8, 2024, 11 pages.

* cited by examiner

*Primary Examiner* — Esther B. Henderson
(74) *Attorney, Agent, or Firm* — Shook Hardy & Bacon L.L.P.

(57) ABSTRACT

The technology described herein builds an encrypted computational graph for deployment to a client device. The encrypted computational graph includes a machine-learning model's components (e.g., weights and biases) with instructions to perform various operations to allow the particular machine learning model to make an inference. A runtime environment operating on the client device may help execute the encrypted computational graph. The runtime environment may be able to facilitate execution without being able to decrypt the encrypted machine model data. Instead, the model data is only descripted within trusted execution environments of processors at the hardware level. The encrypted computational graph may be built on a client-by-client basis to create a unique computational graph for a specific client device. At the very least, the encryption may be specific to a trusted execution environment of a specific device.

20 Claims, 7 Drawing Sheets

MACHINE LEARNING MODEL DEPLOYED TO AN ENCRYPTED COMPUTATIONAL GRAPH

CROSS-REFERENCE TO RELATED APPLICATIONS

None.

BACKGROUND

Neural networks are a key component of artificial intelligence and are used in a wide range of applications, from image recognition to natural language processing. Large neural networks (NNs), such as large language models (LLMs) have been widely adopted, both in academia and in the industry. A LLM is a type of artificial intelligence model that has been trained on a vast amount of text data. It may learn to predict the next word in a sentence by understanding the context provided by the preceding words. This ability allows it to generate human-like text, given an initial input. LLMs, such as a Generative Pre-training Transformer (GPT) model, may have billions of parameters that are fine-tuned during training, enabling them to capture complex patterns in language use. They can answer questions, write essays, summarize texts, translate languages, and even generate code. However, their increasing model complexity, manifested through billions to trillions of parameters, has presented significant challenges for their deployment and execution.

One major challenge stems from the growing interest to deploy NNs on edge computing devices. When deployed in a server, the NN may be secured from theft. The learned parameters of the NN may not be easily inspected or analyzed by users. In contrast, a NN deployed to a client may be inspected or copied. Deploying a NN to a less trusted and less secure environment presents critical security risks for this valuable intellectual property to be stolen.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein builds an encrypted computational graph for deployment to a client device. The encrypted computational graph includes a machine-learning model's components (e.g., weights and biases) with instructions to perform various operations to allow the particular machine learning model to make an inference. A runtime environment operating on the client device may help execute the encrypted computational graph. The runtime environment may be able to facilitate execution without being able to decrypt the encrypted machine model data. Instead, the model data is only decrypted within trusted execution environments of processors at the hardware level.

The technology described herein encrypts machine-learning model data at a deployment server. The deployment server deploys the encrypted machine-learning model data to the operating system in the form an encrypted computational graph. Neither the operating system nor applications running on the operation system are given the decryption key. Instead, decryption is only possible at a trusted execution environment within the hardware layer. The trusted execution environment maintains the confidentially of the information from the operating system. Thus, the technology described herein protects the model data, such as weights, from discover by the operating system or though the operating system.

The encrypted computational graph may be built on a client-by-client basis to create a unique computational graph for a specific client device. At the very least, the encryption may be specific to a trusted execution environment of a specific device. Trusted execution environments on different devices may have separate encryption codes requiring a unique computational graph for each device. Additionally, the capabilities of an individual client device may influence the form the computational graph takes. The computational graph may be optimized for use by a particular computing device. Optimization allows the functions of a machine learning model to be performed by the optimal component or processor on the device.

In order to build a computational graph for a specific client device, information about the client device on which the computational graph will operate is needed. Accordingly, the first phase of building the computational graph may be a discovery phase. As an initial step, the deployment sever may generate a list of operational instructions that need to be included within the computational graph in order for the machine-learning model's functions to be performed. The machine-learning runtime on the client device may provide a list of trusted execution environments that are able to perform different operations associated with an operational instruction. The client device may also provide encryption information for each trusted execution environment.

The deployment server then builds a computational graph where the machine-learning model's data is encrypted in a graph node. The model runtime on the client may provide the encrypted model data to the trusted execution environment where it is decrypted and used to generate an output. In this way, the model can be executed on the client without directly exposing the model to the operating system or applications running on the operating system. This eliminates the need for the model provider to trust the operating system.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
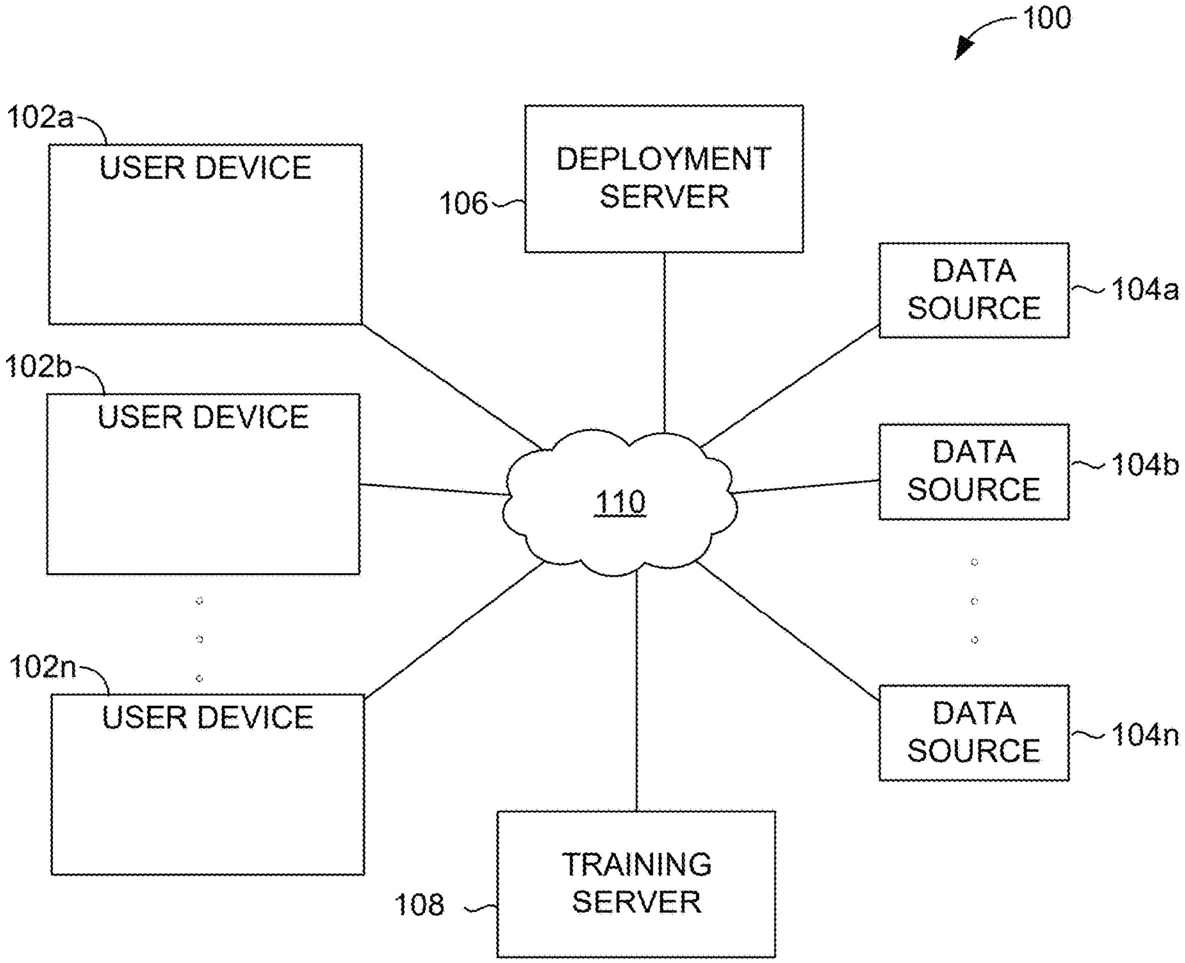
FIG. 1 is a diagram of a computing system suitable for implementations of the technology described herein.

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein builds an encrypted computational graph for deployment to a client device. The encrypted computational graph includes a machine-learning model's components (e.g., weights and biases) with instructions to perform various operations to allow the particular machine learning model to make an inference. A runtime environment operating on the client device may help execute the encrypted computational graph. The runtime environment may be able to facilitate execution without being able to decrypt the encrypted machine model data. Instead, the model data is only decrypted within trusted execution environments of processors at the hardware level.

The technology described herein encrypts machine-learning model data at a deployment server and deploys it to the operating system in the form an encrypted computational graph. Neither the operating system nor applications running on the operation system are given the decryption key. Instead, decryption is only possible at the trusted execution environment within the hardware layer. The trusted execution environment maintains the confidentially of the information from the operating system. Thus, the technology described herein protects the model data, such as weights, from discover by the operating system or though the operating system.

A machine-learning runtime environment on the client device may deploy portions of the encrypted computational graph to one or more trusted execution environments on the client device. The client device may have one or more trusted execution environments. For example, the central processing unit (CPU) may be associated with one or more trusted execution environments, the graphics processing unit (GPU) may be associated with one or more trusted execution environments, and a neural processing unit (NPU) may be associated with one or more trusted execution environments. A trusted execution environments is able to decrypt model components.

The encrypted computational graph may be built on a client-by-client basis to create a unique computational graph for a specific client device. At the very least, the encryption may be specific to a trusted execution environment of a specific device. In general, each device may have separate encryption codes requiring a unique computational graph. Additionally, the capabilities of an individual client device may influence the form the computational graph takes. The computational graph may be optimized for use by a particular computing device. Optimization allows the functions of a machine learning model to be performed by the optimal component or processor on the device.

In order to build a computational graph for a specific client device, information about the client device on which the computational graph will operate is needed. Accordingly, the first phase of building the computational graph may be a discovery phase. As an initial step, deployment sever may generate a list of operational instructions that need to be included within the computational graph in order for the machine-learning model's functions to be performed. The machine-learning runtime on the client device may provide a list of trusted execution environments that are able to perform different operations associated with an operational instruction. The client device may also provide encryption information for each trusted execution environment. The deployment server then builds a computational graph where the machine-learning model's data is encrypted in a graph node.

The deployment server then builds a computational graph where the machine-learning model's data is encrypted in a graph node. The model runtime on the client may provide the encrypted model data to the trusted execution environment where it is decrypted and used to generate an output. In this way, the model can be executed on the client without directly exposing the model to the operating system or applications running on the operating system. This eliminates the need for the model provider to trust the operating system.

It should be noted that the phrase trusted and untrusted are not absolute judgements about the trustworthiness of environments. In general, the trusted environment may be controlled by the entity that is deploying the model. The entity's control over the computing environment causes it to be trusted by the entity. The security of the untrusted environment may be outside of the control of the entity, making it untrusted. The untrusted environment may, in fact, be secure, potentially even more secure than the trusted environment. In many of the examples used herein, the trusted environment may be described as a cloud environment or server environment. The untrusted environment may be described as an edge environment, user device, or client environment, except for the trusted execution environments on the client device.

Operating some neural networks, such as large language models, is resource intensive. The resources used include processing capacity, computer memory, and electricity. The use of client resources to run the neural networks may reduce the need build out larger data centers. However, deploying a trained neural network to the client may essentially give away the valuable neural network. It is desirable to utilize client resources to operate a neural network without giving away the trained neural network. The technology described herein only exposes the model to trusted execution environments on the client without granting the user of the device or the operating system access to the model data.

The technologies herein are described using key terms wherein definitions are provided. However, the definitions of key terms are not intended to limit the scope of the technologies described herein.

As used herein, a trusted execution environment (TEE) is a secure area of a processor, such as a central processing unit (CPU), graphics processing unit (GPU), and/or neural processing unit (GPU). A TEE helps maintain confidentiality and integrity of code and data loaded inside it. Data confidentiality prevents unauthorized entities outside the TEE from reading data. Integrity prevents code or data in the TEE from being replaced or modified by unauthorized entities, which may also be the computer owner and/or computer operating system. Confidentiality and integrity may be provided by implementing unique, immutable, and confidential architectural security. Confidential architectural security can include hardware-based memory encryption that isolates specific application code and data in memory. The confidential architectural security may allow user-level code to allocate private regions of memory, called enclaves, which are designed to be protected from processes running at higher privilege levels.

The TEE may include a hardware isolation mechanism, plus a secure operating system running on top of that isolation mechanism. Only trusted applications running in a TEE have access to the full power of a corresponding processor, while hardware isolation protects these from user installed apps running in a main operating system or the operating system itself. Software and cryptographic isolation inside the TEE may protect the trusted applications contained within from each other.

The TEE may use a so-called "hardware root of trust." This is a set of private keys that are embedded directly into the chip during manufacturing. These cannot be changed, even after device resets, and whose public counterparts reside in a manufacturer database, together with a non-secret hash of a public key belonging to the trusted party (usually a chip vendor).

As used herein, a machine-learning runtime environment is a software environment that facilitates the execution of machine learning models. It provides a platform for deploying, managing, and executing machine learning models that have been trained and tested using various machine learning frameworks. The primary function of a machine learning runtime is to interpret the trained model and make predictions based on the input data. It does this by taking the model, which is essentially a mathematical function, and applying it to the input data to generate output predictions. A machine learning runtime may support multiple machine learning frameworks, such as TensorFlow, PyTorch, or Scikit-learn. This allows developers to train models using the framework of their choice and then deploy them using the same runtime.

In addition to executing models, a machine learning runtime may also provide features for optimizing model performance. This can include techniques for reducing latency, improving throughput, and minimizing resource usage. Furthermore, a machine learning runtime may offer support for various hardware configurations, including CPUs, GPUs, and specialized accelerators. This allows the runtime to optimize model execution based on the available hardware resources.

Open Neural Network Exchange (ONNX) is an example of a machine-learning runtime that may be used with aspects of the technology described herein. ONNX Runtime is a high-performance, cross-platform machine learning runtime that serves as an accelerator for machine learning models. It is designed to support a wide range of hardware and software configurations, making it highly versatile. ONNX Runtime can be used with models from various popular frameworks, such as PyTorch, TensorFlow/Keras, TFLite, and scikit-learn. This flexibility allows developers to train models in Python and then deploy them into a C#/C++/Java app. ONNX Runtime can be used with models from various popular frameworks such as PyTorch, TensorFlow/Keras, TFLite, and scikit-learn. This flexibility allows developers to train models in Python and then deploy them into a C#/C++/Java app. Other machine-learning runtimes includes Databricks' Machine Learning Runtime (MLR), Cloudera Machine Learning (CML) Runtimes, and MLeap. Each of these runtimes has its own unique features and capabilities, making them suitable for different use cases and requirements.

As used herein, a computational graph is a tool used to represent and execute complex mathematical computations that underlie machine learning models. A computational graph is essentially a directed graph where the nodes represent operations or variables, and the edges between nodes represent the flow of data. The data flowing on these edges may be multidimensional arrays, also known as tensors. The operations associated with nodes often involve mathematical computations on tensors, such as matrix multiplications, convolutions, or recurrent operations. The variables can be the parameters of the model that are learned during the training process.

Once the model is trained, the computational graph provides a blueprint of the computations that need to be performed to make a prediction with the model. The computational graph can then be optimized for efficient execution, which is particularly important for large-scale machine learning applications.

As used herein, an encrypted computational graph is a normal computational graph, except with all or portions of the node's data (e.g., operations and variables) encrypted. Thus, the parameters of the model that are learned during the training process may be encrypted. In aspects, a computation for a node may performed by a trusted execution environment that is able to decrypt the model data and generate a node output. The node output may be passed along an edge to the next node.

The machine-learning model deployed to the client may be a language model. A "language model" is a set of statistical or probabilistic functions that performs Natural Language Processing (NLP) in order to understand, learn, and/or generate human natural language content. A language model is one example of a neural network. For example, a language model can be a tool that determines the probability of a given sequence of words occurring in a sentence (e.g., via NSP or MLM) or natural language sequence. Simply put, it can be a tool which is trained to predict the next word in a sentence. A language model is called a large language model ("LLM") when it is trained on enormous amount of data. Some examples of LLMs are GOOGLE's BERT and OpenAI's GPT-2 and GPT-3. GPT-3, and GPT-4, which has over 175 billion parameters trained on over 570 gigabytes of text. These models have capabilities ranging from writing an essay to generating complex computer codes-all with limited to no supervision. Accordingly, an LLM is a deep neural network that is very large (billions to hundreds to trillions of parameters) and understands, processes, and produces human natural language by being trained on massive amounts of text. These models can predict future words in a sentence letting them generate sentences similar to how humans talk and write. In some embodiments, the LLM is pre-trained (e.g., via NSP and MLM on a natural language corpus to learn English) without having been fine-tuned, but rather uses prompt engineering/prompting/prompt learning using one-shot or few-shot examples.

A language model may perform various tasks, such as machine translation, natural language summary, question answering, and sentiment analysis. A "natural language summary" as described herein refers to text summarization. Text summarization (or automatic summarization or NLP text summarization) is the process of breaking down text (e.g., several paragraphs) into smaller text (e.g., one sentence or paragraph). In other words, text summarization is the process of distilling the most important information from a source (or sources) to produce an abridged version for a particular user (or users) and task (or tasks). This method extracts vital information while also preserving the meaning of the text. This reduces the time required for grasping lengthy pieces such as articles without losing vital information, for example. For example, using extraction summarization, some embodiments, using NLP, detect key chunks of natural language text, extracting or cutting them out, then stitching them back together to create a shortened form of the dataset. For instance, a sentence in the dataset may read, "I'm heading to the supermarket by taking Ray road. Hopefully there will not be as much traffic at that time. I'm going to buy fruit." Extraction summarization may work by reducing the characters to "I'm heading to the supermarket. I'm going to buy fruit." In another example, abstractive summarization works by generating new sentences (or other natural language characters) from the original dataset. For example, using the original dataset described above, the summarization may be, "I'm heading to the store to buy fruit," where "store" is a new word input into the new sentence (e.g., based on NLP semantic analysis and/or Named Entity Recognition NER and "I'm going" is removed from the original sentence. NER is an information extraction technique that identifies and classifies tokens/words or "entities" in natural language text into predefined categories. Such predefined categories may be indicated in corresponding tags or labels, which can be used in summaries. Entities can be, for example, names of people, specific organizations, specific locations, specific times, specific quantities, specific monetary price values, specific percentages, specific pages, and the like.

A neural network is a computational model that consists of layers of nodes, or "neurons," each receiving input, processing it, and passing the output to the next layer. Neural networks can include different types of layers. Example layer types include convolutional, activation, pooling, fully connected, batch normalization, dropout, recurrent layers, feedforward layers, embedding layers, and attention layers.

Having briefly described an overview of aspects of the technology described herein, an operating environment in which aspects of the technology described herein may be implemented is described below in order to provide a general context for various aspects.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102*a* through 102*n*; a number of data sources, such as data sources 104*a* and 104*b* through 104*n*; deployment server 106; training sever 108; and network 110. Each of the components shown in FIG. 1 is implemented via any type of computing device, such as computing device 700 illustrated in FIG. 7, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 700 in FIG. 7. For instance, deployment server 106 may be provided via multiple devices arranged in a distributed environment that collectively provides the functionality described herein. Additionally, other components not shown may also be included within the distributed environment.

User devices 102*a*, 102*b*, through 102*n* can be client user devices on the client-side of operating environment 100, while deployment server 106 and training server 108 can be on the server-side of operating environment 100. The user devices may be described as client devices, edge devices, and/or untrusted devices herein. Deployment server 106 and training server 108 can comprise server-side software designed to work in conjunction with client-side software on user devices 102*a* through 102*n* so as to implement any combination of the features and functionalities discussed in the present disclosure. In one aspect, the deployment server 106 hosts a graph building system that deploys encrypted models to provide a response to an input. The encrypted models may be deployed as an encrypted computational graph. Model data from different nodes in the graph may be communicated to a trusted execution environment on CPU, NPU, or GPU. The trusted execution environment will have the encryption key to decrypt the model data and perform the operations associated with the node. The result may be provided back to the encrypted model and provided for processing by one or more downstream nodes in the encrypted computational graph.

In aspects, the user devices 102*a* through 102*n* provide a user interface to the hybrid neural network environment 200. The user interface may facilitate reception of user input, such as a natural language prompt, query, and/or image. The user interface may also provide a final output generated by machine learning model represented by the encrypted computational graph. This division of operating environment 100 is provided to illustrate one example of a suitable environment, and there is no requirement for each implementation that any combination of server 106 and user devices and 102*a* through 102*n* remain as separate entities.

In some embodiments, user devices 102*a* through 102*n* comprise any type of computing device capable of use by a user. For example, in one embodiment, user devices 102*a* through 102*n* are the type of computing device 700 described in relation to FIG. 7. By way of example and not limitation, a user device is embodied as a personal computer (PC), a laptop computer, a mobile device, a smartphone, a tablet computer, a virtual-reality (VR) or augmented-reality (AR) device or headset, a handheld communication device, an embedded system controller, a consumer electronic device, a workstation, any other suitable computer device, or any combination of these delineated devices.

In some embodiments, data sources 104*a* and 104*b* through 104*n* comprise data sources and/or data systems, which are configured to make data available to any of the various constituents of operating environment 100, environment 200, or environment 300 described in connection to FIGS. 2 and 3. The data sources may include training data for the training server 108 or model trainer and/or input and output from a trained model. The training server 108 may train a machine learning model before it is deployed to a client device and server. Certain data sources 104*a* and 104*b* through 104*n* are discrete from user devices 102*a* through 102*n* and deployment server 106 or are incorporated and/or integrated into at least one of those components. In one embodiment, one or more of data sources 104*a* and 104*b* through 104*n* comprise one or more sensors, which are integrated into or associated with one or more of the user device(s) 102*a* through 102*n* or server 106. For example, the data sources could include a web camera used to interact with a virtual environment.

Figure 2:
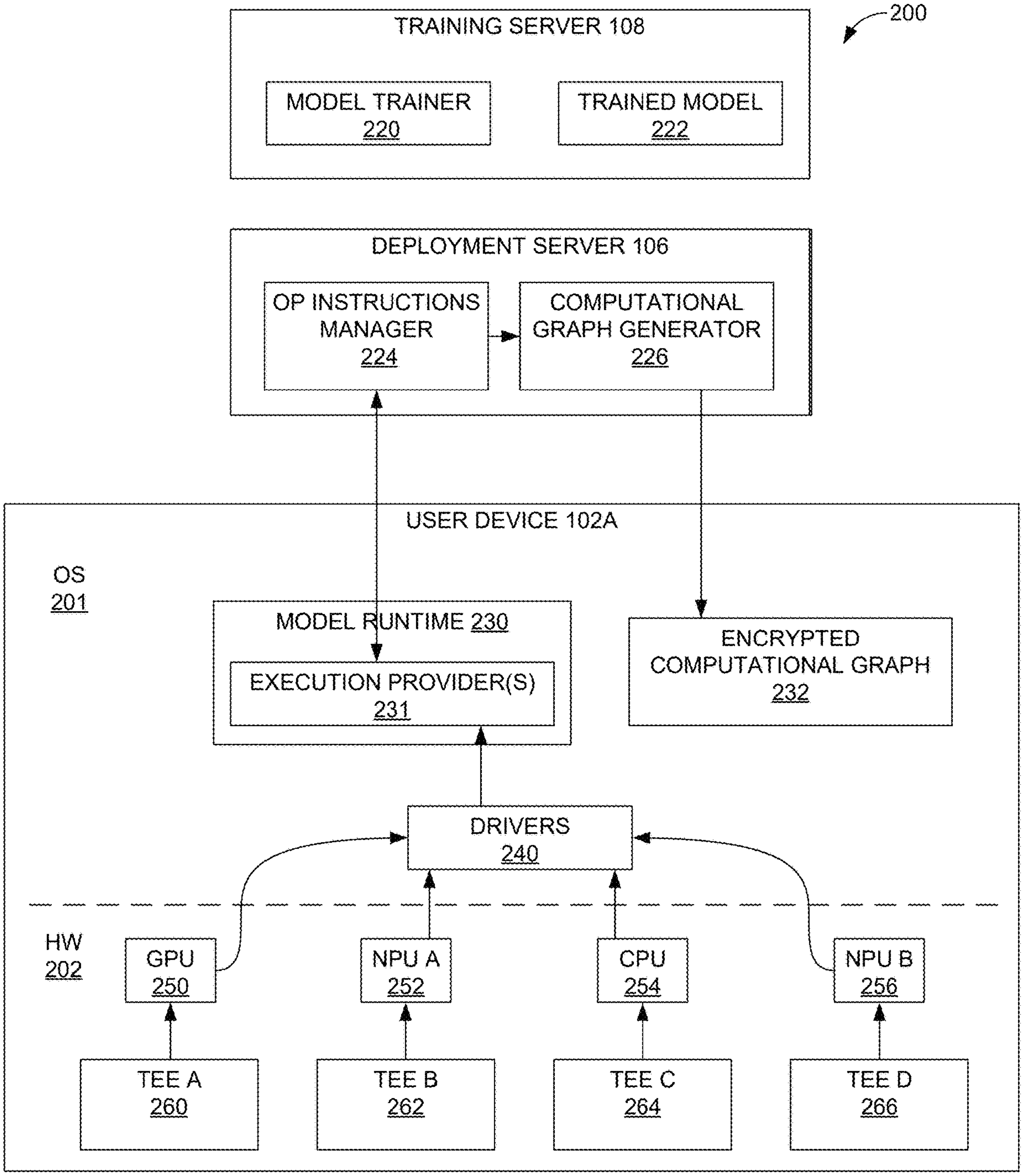
FIG. 2 is a block diagram of an example operating environment for building an encrypted computational graph, in accordance with an aspect of the technology described herein.
Figure 3:
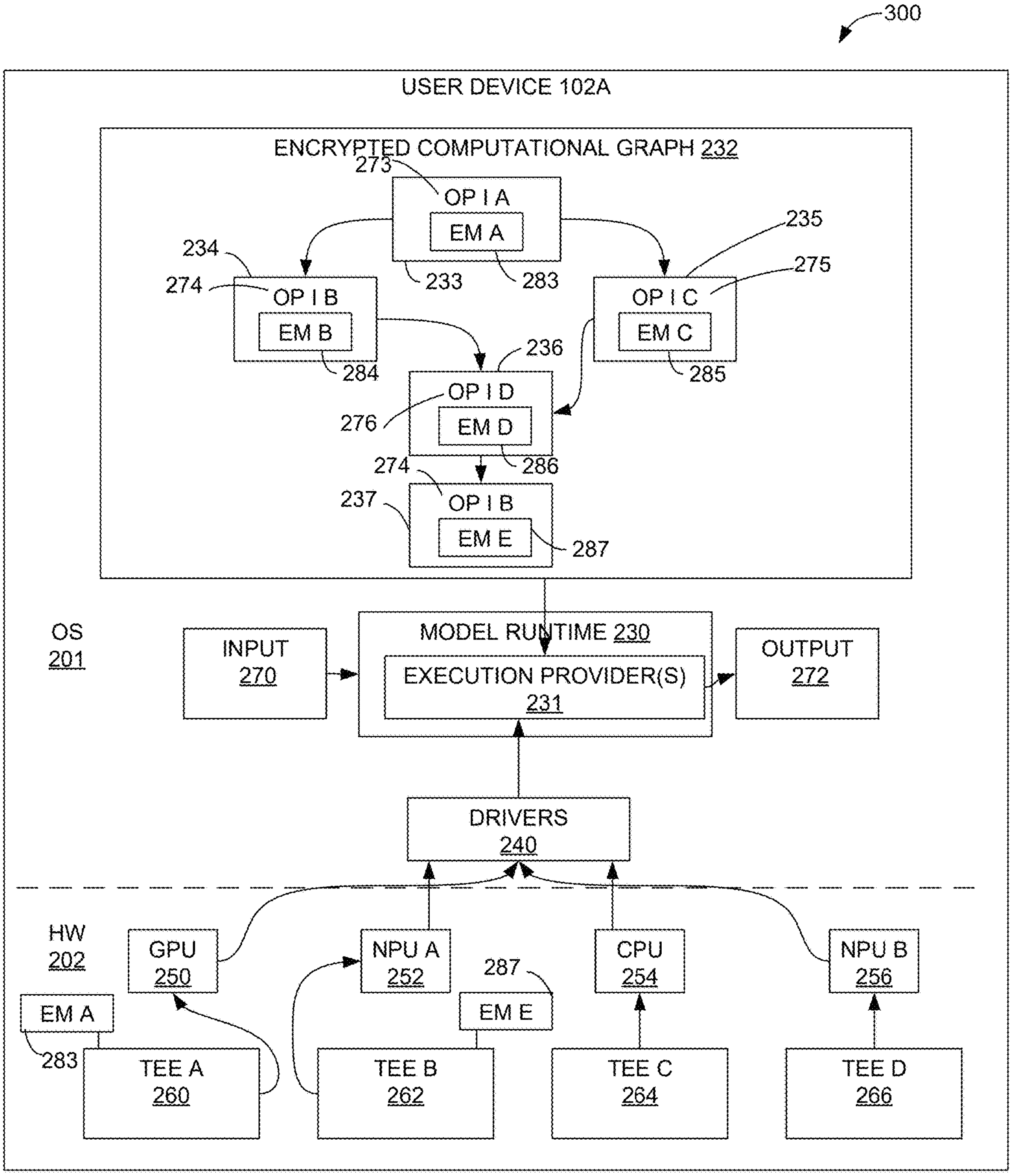
FIG. 3 is a block diagram illustrating the operating of an encrypted computational graph, in accordance with an aspect of the technology described herein.

Operating environment 100 can be utilized to implement one or more of the components of environment 200 and environment 300, as described in FIGS. 2 and 3. Operating environment 100 can also be utilized for implementing aspects of methods 400, 500, and 600 in FIGS. 4, 5, and 6, respectively.

Referring now to FIG. 2 with FIG. 1, a block diagram is provided showing aspects of an example environment suitable for implementing some embodiments of the disclosure and designated generally as environment 200. The environment 200 includes the training server 108, the user device 102*a*, and the deployment server 106.

The user device 102*a* includes an operating system layer 201 and a hardware layer 202. The hardware layer 202 is the physical layer of a computer or user device. It consists of the actual electronic components and devices that make up the computer, such as the CPU, memory, disk drives, keyboard, mouse, display screen, etc. The hardware layer is responsible for executing the low-level instructions and operations that are necessary for the functioning of the computer.

The operating system (OS) layer 201 sits directly above the hardware layer 202. The OS layer 201 is software that manages the hardware resources of a computer and provides various services for computer programs. It acts as an intermediary between the user's applications and the computer hardware. Key functions of the operating system include managing the computer's memory, controlling input and output devices, managing files and directories on the disk, and providing a user interface. The operating system layer abstracts the complexities of the hardware layer, providing a consistent and user-friendly interface for applications to interact with the hardware. This allows application developers to focus on the logic of their applications without worrying about the specifics of the underlying hardware.

The technology described herein encrypts machine-learning model data in the deployment server and deploys it to the operating system layer 201 in the form an encrypted computational graph 232. Neither the operating system layer 201 nor applications running on the operating system are given the decryption key. Instead, decryption is only possible at the trusted execution environment within the hardware layer 202. The trusted execution environment maintains the confidentially of the information from the operating system. Thus, the encrypted computational graph is protecting the model data, such as weights, from discover by the operating system or though the operating system.

The environment 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. These components may be embodied as a set of compiled computer instructions or functions, program modules, computer software services, or an arrangement of processes carried out on one or more computer systems.

In one embodiment, the functions performed by components of environment 200 are associated with training and using a machine-learning model. These components, functions performed by these components, and/or services carried out by these components may be implemented at appropriate abstraction layer(s) such as the operating system layer, application layer, and/or hardware layer of the computing system(s). Alternatively, or in addition, the functionality of these components, and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example environment 200, it is contemplated that in some embodiments functionality of these components can be shared or distributed across other components and/or computer systems.

By way of overview, the training server 108 includes a model trainer 220 that generates a trained machine-learning model 222. The machine-learning model 222 may take many different forms and/or follow different architectures. In some types of models, the model trainer 220 may use training data to train the machine-learning model 222 to perform a task. Once trained, the deployment server 106 builds an encrypted computational graph 232 from the machine-learning model and deploys it to a machine-learning model runtime 230 on the user device 102A. The encrypted computational graph may be built on a client-by-client basis to create a unique encrypted computational graph 232 for a specific client device. At the very least, the encryption used may be specific to a trusted execution environment of a specific device. In general, each device may have separate encryption codes requiring a unique computational graph. Additionally, the capabilities of an individual device may dictate the form the computational graph takes. For example, the computational graph may be built to optimize use of the processing power available for a particular computing device, such that the functions of a machine learning model may be performed by the optimal component or processor.

In order to build a computational graph for a specific client device, information about the client device on which the computational graph will operate may be needed. Accordingly, the first phase of building the computational graph may be a discovery phase. As an initial step, the operational instructions manager 224 may generate a list of operational instructions that will be included within the computational graph in order for the machine-learning model's functions to be performed. In one aspect, the operational instructions are determined by a model runtime instance operated on the deployment server. The model runtime instance may be the same or similar to the model runtime 230 instance running on the particular client device. Different model runtime instances may be implemented by the operational instructions manager 224 in order to generate accurate operational instructions. For example, even within the same runtime platform different versions of the platform may exist. The operational instructions manager 224 may use an identical version in order to generate the correct operational instructions. Alternatively, a heuristic or other method may be used to generate the operational instructions needed to build a computational graph for a particular model.

Different models may require different operational instructions. For example, a model with a convolutional layer may need an operational instruction that describes the required convolutional operations. Similarly, a fully connected layer may require a first operational instruction that describe the matrix multiplication of weights against inputs and a second operational instruction describing various activation functions. The weights of the model are separate from the operational instruction. The weights of the model may be included within the nodes of the computational graph. The node may then be associated with an operational instruction. The operational instruction may simply represent a class of operations rather than providing a detail about a specific operation. For example, the operational instruction may simply specify a convolutional operation without details. The operational instructions may differ based on the type of model runtime 230 used. In the ONNX runtime, the operational instructions may be described as operational codes or opcodes.

Once the plurality of operational instructions needed to implement a particular model are identified, the plurality is communicated to the model runtime 230 on the user device 102A. The execution provider component 231 may then send queries to the various processors on the hardware side of the user device 102A. The purpose of the queries is to ask whether a trusted execution environment on a processor is capable of performing tasks associated with the operational instruction. These queries may be sent through the drivers 240 and responses from the different processors may be received through the drivers 240. The processors shown include a GPU 250, and NPU A 252, a CPU 254, and an NPU B 256. Each of these processors includes a trusted execution environment. TEE A 260 is the trusted execution environment for the GPU 250. TEE B 262 is the trusted execution environment for the NPU A 252. TEE C 264 is the trusted execution environment for the CPU 254. TEE D 266 is the trusted execution environment for the NPU B 256. Although not shown, portions of each processor may be outside of their respective trusted execution environments. Further, the user device 102A may include processors that do not include trusted execution environments.

Each of the processors may provide a response to the queries. The response may indicate which of the operational instructions the TEE on the processor is able to handle. The response may also include information about the capabilities of the TEE and/or processor. These capabilities can include the amount of memory allocated to the trusted execution environment. The information can also include a public encryption key for a TEE that can be used to encrypt machine learning model data, such as weights, within a node of the computational graph. The trusted execution environment can then use its private key or other method to decrypt the model data once the model data is provided to the trusted execution environment, as explained in more detail in FIG. 3. The response can also include validation information that the deployment server 106 is able to use to validate that the trusted execution environment should be trusted. For example, the validation information can be used to determine that the response to the query was not spoofed by a malicious component.

The computational graph generator 226 may use the response data to build an encrypted computational graph. Before doing so, the deployment server 106 may validate the various trusted execution environments an amount to determine that the deployment server 106 should trust these environments. Additionally, the computational graph generator 226 may determine that the computing device includes sufficient trusted execution environments to effectively operate the encrypted computational graph, if deployed. For example, executing an LLM is resource intensive. It is not desirable to build and deploy an encrypted computational graph for an LLM to a computing device that would not be able to effectively execute the LLM using only the trusted execution environment. The deployment server 106 and/or the computational graph generator 226 may use various threshold criteria to determine when the resources are adequate for a particular model. If the resources are not adequate, the process may be aborted without building or deploying an encrypted computational graph.

If the available trusted environments on a device pass validation and the resources available to the client device 102A appear adequate, then an encrypted computational graph 232 is built and deployed to the user device 102A. As mentioned, the deployment server 106 may include an instance of the machine learning model runtime that matches the model runtime 230 on the user device 102A. The runtime may receive a machine-learning model 222 in any number of formats and use it to generate a computation graph that is executable by the model runtime 230. Once built, the model data associated with each node of the computation graph may be encrypted using an encryption key for a specific trusted execution environment assigned to the node. As mentioned, the encryption key may have been provided during the discovery phase. Each node may be assigned an operational instruction that is specific to a single trusted execution environment. In this way, the model runtime 230 is able to assign the node operations for each node to a trusted execution environment that is able to decrypt the encrypted model data. A specific operational instruction for a specific trusted execution environment is contrary to typical practice, where the operational instruction simply specifies a type of operation to be executed but does not identify a specific execution environment. In aspects, the TEE may provide a unique operational instruction during discovery. The unique operational instruction may be built by adding a unique identifier for the TEE to a typically used operational instruction identifier. The unique identifier may only be unique enough to differentiate TEEs on a device. In this way, the same unique identifiers could be used on different devices. Operation of the encrypted computational graph 232 is illustrated with FIG. 3. Before moving to the description of FIG. 3, an example training of an LLM by the model trainer 220 is provided.

The model trainer 220 of the training server 108 generates a trained machine-learning model 222. For the sake of illustration, the model trainer 220 may train a Large Language Model (e.g., a BERT model or GPT-4 model) that uses particular inputs to make particular predictions (e.g., generate answers), according to some embodiments. In some embodiments, this model represents or includes the functionality as described with respect to the trained machine-learning model 222.

The model training may occur through a combination of processes. First, a natural language corpus (e.g., various WIKIPEDIA English words or BooksCorpus) of the inputs are converted into tokens and then feature vectors and embedded into an input embedding to derive meaning of individual natural language words (for example, English semantics) during pre-training. In some embodiments, to understand English language, corpus documents, such as text books, periodicals, blogs, social media feeds, and the like are ingested by the language model.

In some embodiments, each word or character in the input(s) is mapped into the input embedding in parallel or at the same time, unlike existing long short-term memory (LSTM) models, for example. The input embedding maps a word to a feature vector representing the word. But the same word (for example, "apple") in different sentences may have different meanings (for example, phone v. fruit). This is why a positional encoder can be implemented. A positional encoder is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sign/cosine function to generate the positional encoder vector as follows:

$$PE_{(pos, 2i)} = \sin(pos/10000^{2i/d_{model}})$$

$$PE_{(pos, 2i+1)} = \cos(pos/10000^{2i/d_{model}})$$

After passing the input(s) through the input embedding and applying the positional encoder, the output is a word embedding feature vector, which encodes positional information or context based on the positional encoder. These word embedding feature vectors are then passed to the encoder and/or decoder block(s), where it goes through a multi-head attention layer and a feedforward layer.

The multi-head attention layer is generally responsible for focusing or processing certain parts of the feature vectors representing specific portions of the input(s) by generating attention vectors. For example, in Question Answering systems, the multi-head attention layer determines how relevant the ith word (or particular word in a sentence) is for answering the question or relevant to other words in the same or other blocks, the output of which is an attention vector. For every word, some embodiments generate an attention vector, which captures contextual relationships between other words in the same sentence or other sequence of characters. For a given word, some embodiments compute a weighted average or otherwise aggregate attention vectors of other words that contain the given word (for example, other words in the same line or block) to compute a final attention vector.

In some embodiments, a single headed attention has abstract vectors Q, K, and V that extract different components of a particular word. These are used to compute the attention vectors for every word, using the following formula:

$$Z = \mathrm{softmax}\left(Q.K^{T}/\sqrt{\text{Dimension of vector } Q, K \text{ or } V}\right).V$$

For multi-headed attention, there a multiple weight matrices Wq, Wk and Wv. so there are multiple attention vectors Z for every word. However, a neural network may only expect one attention vector per word. Accordingly, another weighted matrix, Wz, is used to make sure the output is still an attention vector per word. In some embodiments, after the layers and, there is some form of normalization (for example, batch normalization and/or layer normalization) performed to smoothen out the loss surface making it easier to optimize while using larger learning rates.

The LLM may include residual connection and/or normalization layers where normalization re-centers and re-scales or normalizes the data across the feature dimensions. The feedforward layer is a feed forward neural network that is applied to every one of the attention vectors outputted by the multi-head attention layer. The feedforward layer transforms the attention vectors into a form that can be processed by the next encoder block or making a prediction. For example, given that a document includes first natural language sequence "the due date is . . . " the encoder/decoder block(s) predicts that the next natural language sequence will be a specific date or particular words based on past documents that include language identical or similar to the first natural language sequence.

In some embodiments, the initial embedding (for example, the input embedding) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence number (that includes the input(s)) that is encoded into a vector (for example, first sentence, second sentence, etc. assuming a top-down and right-to-left approach). The position embeddings are vectors that represent the position of a particular word in such sentence that can be produced by positional encoder. When these three embeddings are added or concatenated together, an embedding vector is generated that is used as input into the encoder/decoder block(s). The segment and position embeddings are used for temporal ordering since all of the vectors are fed into the encoder/decoder block(s) simultaneously and language models need some sort of order preserved.

In some embodiments, once pre-training is performed, the encoder/decoder block(s) performs prompt engineering (fine-tuning or prompt-tuning) and/or zero-shot learning on a variety of QA (e.g., prompt and output) data sets by converting different QA formats into a unified sequence-to-sequence format. For example, some embodiments perform the QA task by adding a new question-answering head or encoder/decoder block, just the way a masked language model head is added (in pre-training) for performing a MLM task, except that the task is a part of prompt engineering, zero-shot learning, prompt-tuning, and/or fine-tuning. This includes the encoder/decoder block(s) processing the inputs (i.e., the target datasets and the prompt instructions) in order to make the predictions and confidence scores. Prompt engineering, in some embodiments, is the process of crafting and optimizing text prompts for language models to achieve desired outputs. In other words, prompt engineering is the process of mapping prompts (e.g., an instruction/question) to the output (e.g., an answer) that it belongs to for training. For example, if a user asks a model to generate a poem about a person fishing on a lake, the expectation is it will generate a different poem each time. Users may then label the output or answers from best to worst. Such labels are an input to the model to make sure the model is giving a more human-like or best answers, while trying to minimize the worst answers (e.g., via reinforcement learning). In some embodiments, a "prompt" as described herein includes one or more of: a request (e.g., a question or instruction (e.g., write a summary of a poem)), one or more datasets, a command or instruction, code snippets, mathematical equations, and/or one or more examples (e.g., one-shot or two-shot examples). The "prompt instructions" as included in the inputs can include any of the instructions as described herein. Once trained through the above method, different method, or variation, the trained machine-learning model 222 is saved and then deployed to the user device 102*a* by the deployment server 106 in the form of an encrypted computational graph 232.

Turing now to FIG. 3, computing environment 300 illustrates the use of an encrypted computational graph 232 to generate an output 272 for a given input 270. Unless noted, the components of FIG. 3 have been described previously with reference to FIG. 2. The encrypted computational graph 232 includes five nodes. The five nodes define operations of the machine learning model while the edges control the flow of node outputs to one or more subsequent nodes. The outputs of an upstream node become the inputs to a downstream node. The nodes in the encrypted computational graph 232 typically may not correspond to nodes in the machine learning model. For example, a single graph node may effectively include the operations of several model layers with each model layer including hundreds or thousands of neurons. Alternatively, a node may correspond to a portion of a single layer of the machine learning model. A focus on building the computational graph may be collecting similar operations within a node that can be processed efficiently in the same hardware environment (e.g., TEE).

The five nodes include a first node 233 that is connected by a first edge to a second node 234 and by a second edge to a third node 235. This arrangement means that the output of the first node 233 will be provided as inputs to the second node 234 and the third node 235. The second node 234 and the third node 235 are connected to the fourth node 236. This arrangement means that the output of the second node 234 will be provided as an input to the fourth node 236. Similarly, the output of the third node 235 will be provided as an input to the fourth node 236. The fourth node 236 is connected to the fifth node 237. The fifth node 237 receives as input the output from the fourth node 236. The output from the fifth node 237 may correspond to the output 272.

Each node includes an operational instruction and encrypted model data. The first node 233 includes an operational instruction A 273 and encrypted machine data A 283. The model runtime 230 will use operational instruction A 273 to associate the encrypted machine data A 283 with the trusted execution environment A 260. Each trusted execution environment may be associated with a specific operational instruction or multiple specific operational instructions. Trusted execution environment A 260 may be associated with operational instruction A 273. That "A" is used as a shorthand for identification information for a specific trusted execution environment. In aspects, the unique operational instruction may include identification information for a specific trusted execution environment. Multiple nodes may be associated with the same operational instruction. As shown, the second node 234 and the fifth node 237 are both associated with the operational instruction B 274. The operational instruction B 274 will cause the associated machine learning data to be communicated to the trusted execution environment B 262. The third node 235 is associated with operational instruction C 275 and the fourth node 236 is associated with the operational instruction D 276.

Each node includes encrypted model data. The first node 233 includes encrypted model data A 283. The second node 234 includes encrypted model data B 284. The third node 235 includes encrypted model data C 285. The fourth node 236 includes encrypted model data D 286. The fifth node 237 includes encrypted model data D 287.

The encrypted model data may be decrypted once communicated to the trusted execution environment. As mentioned, the encryption by the deployment sever 106 may have been done using a public key provided by the TEE. This allows the TEE to be able to decrypt the encrypted machine data for a node assigned to the TEE. Once decrypted the model data may be used to generate a note output that is passed to one or more downstream nodes. In an aspect, the execution provider component 231 uses the operational instruction associated with the node to query the available trusted execution environments. In an aspect, the operational instruction may only be recognized and/or accepted by the corresponding trusted execution environment. The trusted execution environment would then respond by accepting assignment of the operations associated with the node.

EXAMPLE METHODS

Figure 4:
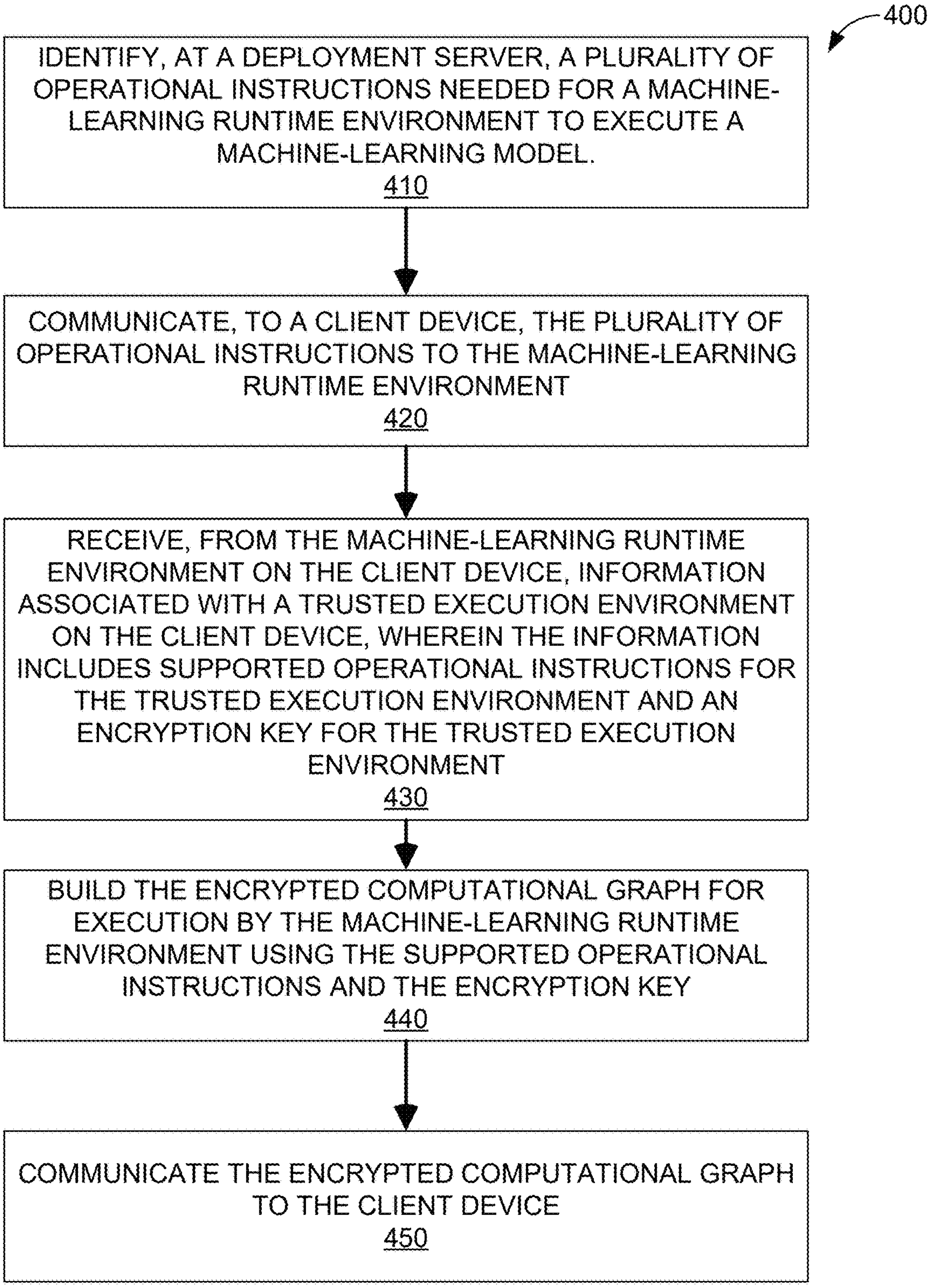
FIG. 4 is a flow diagram showing a method of using an encrypted computational graph, in accordance with an aspect of the technology described herein.
Figure 5:
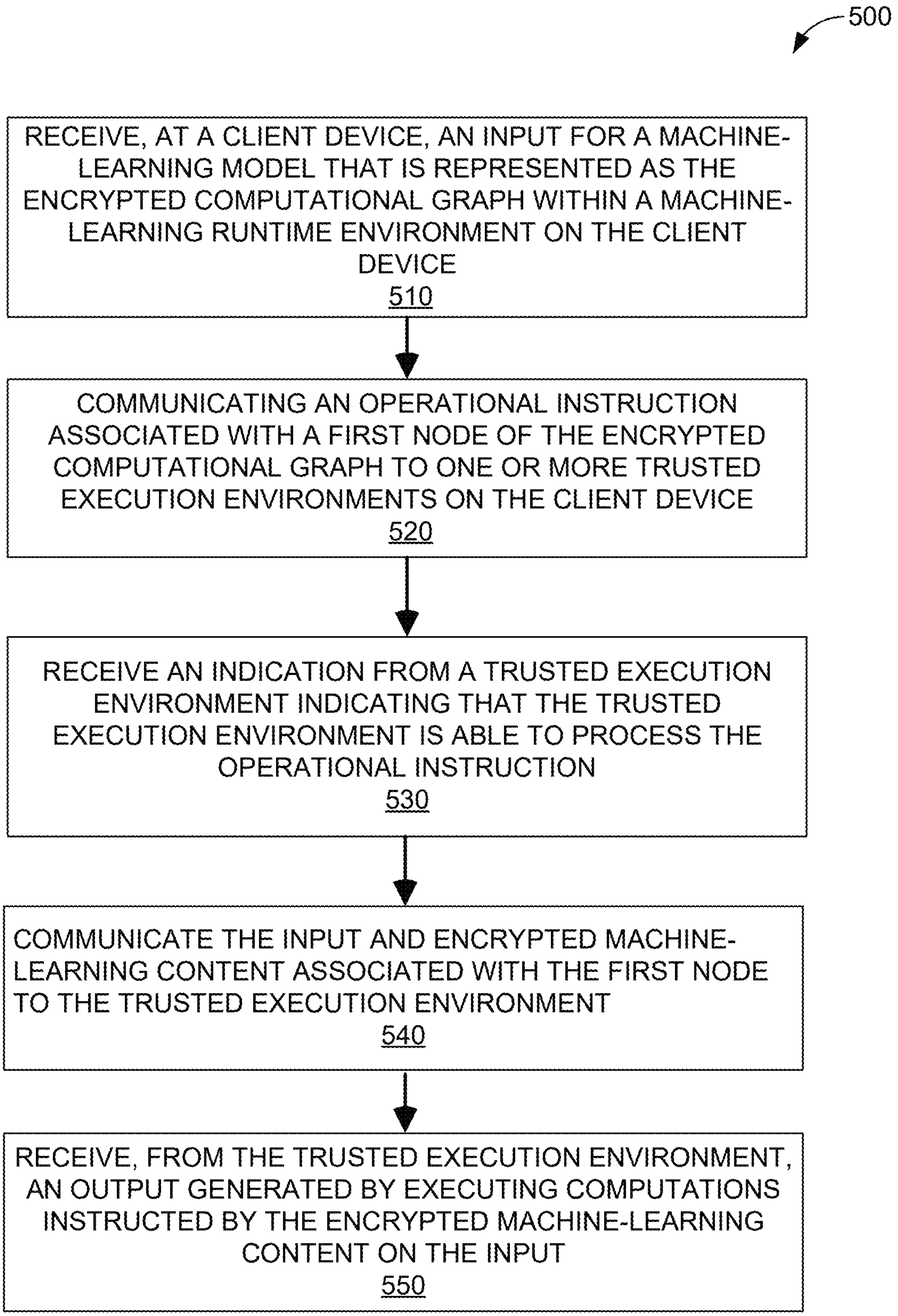
FIG. 5 is a flow diagram showing a method of using an encrypted computational graph, in accordance with an aspect of the technology described herein.
Figure 6:
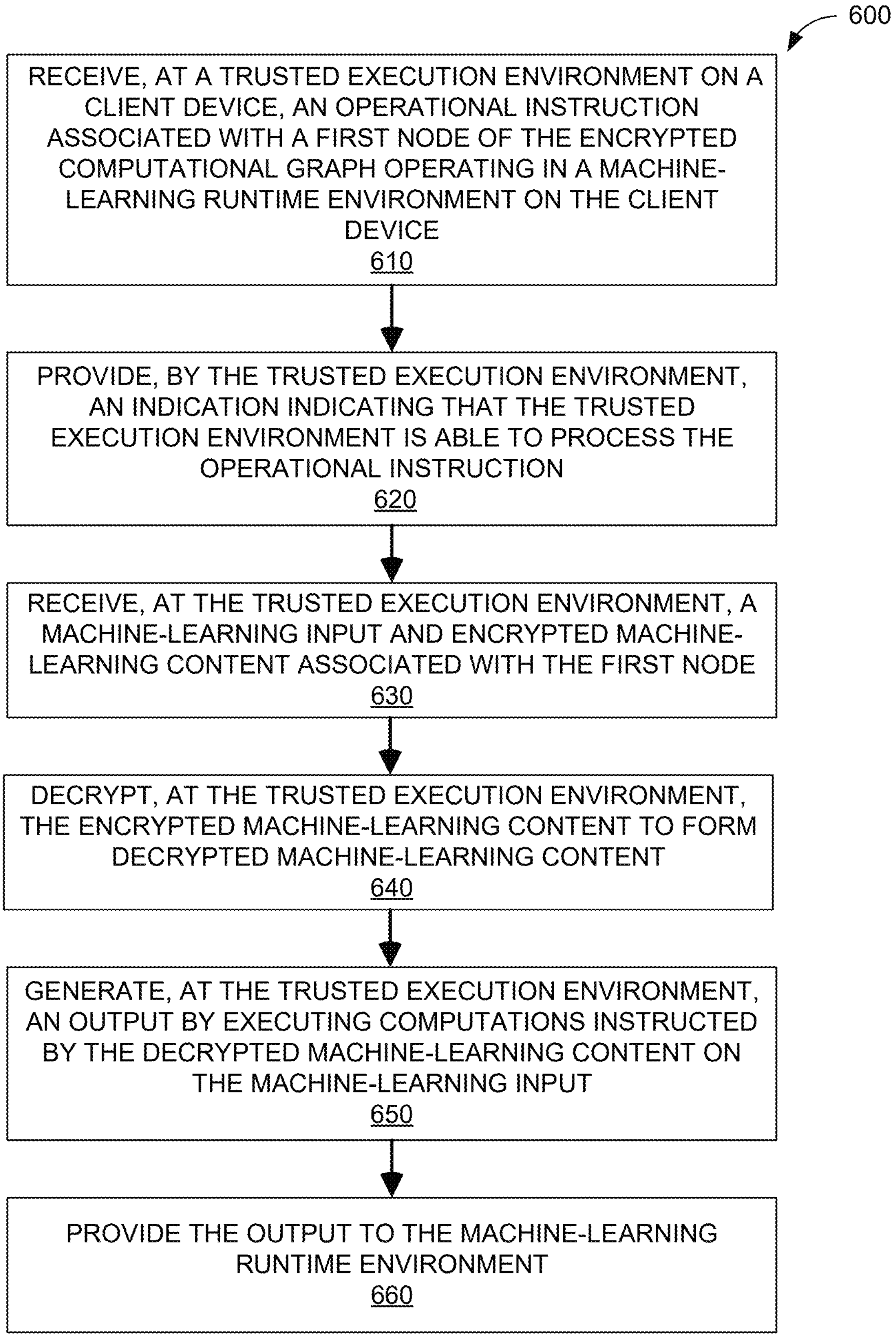
FIG. 6 is a flow diagram showing a method of using an encrypted computational graph, in accordance with an aspect of the technology described herein.

Now referring to FIGS. 4, 5 and 6, each block of methods 400, 500, and 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by an operating system. In addition, methods 400, 500, and 600 are described, by way of example, with respect to FIGS. 1-3. However, these methods may additionally or alternatively be executed by any one system, or any combination of systems, including, but not limited to, those described herein.

FIG. 4 is a flow diagram showing a method 400 of using an encrypted computational graph, in accordance with some embodiments of the present disclosure. Method 400 may be performed on or with systems similar to those described with reference to FIGS. 1-3. At step 410, the method 400 includes identifying, at a deployment server, a plurality of operational instructions needed for a machine-learning runtime environment to execute a machine-learning model. The operational instructions may be generated for a specific machine-learning runtime environment on a specific user device.

In one aspect, the operational instructions are determined by a model runtime instance operated on a deployment server. Alternatively, a heuristic or other method may be used to generate the operational instructions needed to build a computational graph for a particular model. Different models may require different operational instructions. For example, a model with a convolutional layer may need an operational instruction that describes the required convolutional operations. Similarly, a fully connected layer may require a first operational instruction that describe the matrix multiplication of weights against inputs and a second operational instruction describing various activation functions. The operational instruction may simply represent a class of operations rather than providing a detail about a specific operation. For example, the operational instruction may simply specify a convolutional operation without details. The operational instructions may differ based on the type of model runtime 230 used. In the ONNX runtime, the operational instructions may be described as operational codes or opcodes.

At step 420, the method 400 includes communicating, to a client device, the plurality of operational instructions to the machine-learning runtime environment. At step 430, the method 400 includes receiving, from the machine-learning runtime environment on the client device, information associated with a trusted execution environment on the client device. The information includes supported operational instructions for the trusted execution environment and an encryption key for the trusted execution environment. Each of the processors on the client device may provide a response to queries seeking to determine whether the TEE can process a specific operational instruction. The response may indicate which of the operational instructions the TEE on the processor is able to handle. The response may also include information about the capabilities of the TEE and/or processor. These capabilities can include the amount of memory allocated to the trusted execution environment. The information can also include a public encryption key for a TEE that can be used to encrypt machine learning model data, such as weights, within a node of the computational graph. The trusted execution environment can then use its private key or other method to decrypt the model data once the model data is provided to the trusted execution environment. Different trusted execution environments may respond to different operational instructions. The trusted execution environment may be hosted by a GPU, CPU, NPU, or other type of processor.

At step 440, the method 400 includes building the encrypted computational graph for execution by the machine-learning runtime environment using the supported operational instructions and the encryption key. A computational graph is a tool used to represent and execute complex mathematical computations that underlie machine learning models. A computational graph is essentially a directed graph where the nodes represent operations or variables, and the edges between nodes represent the flow of data. The data flowing on these edges may be multidimensional arrays, also known as tensors. The operations associated with nodes often involve mathematical computations on tensors, such as matrix multiplications, convolutions, or recurrent operations. The variables can be the parameters of the model that are learned during the training process. An encrypted computational graph is a normal computational graph, except with all or portions of the node's data (e.g., operations and variables) encrypted. Thus, the parameters of the model that are learned during the training process may be encrypted. In aspects, a computation for a node may performed by a trusted execution environment that is able to decrypt the model data and generate a node output. The node output may be passed along an edge to the next node. Any suitable encryption method may be used. The public key provided by the TEE may correlate to a specific encryption method. At step 450, the method 400 includes communicating the encrypted computational graph to the client device.

FIG. 5 is a flow diagram showing a method 500 of using an encrypted computational graph, in accordance with some embodiments of the present disclosure. Method 500 may be performed on or with systems similar to those described with reference to FIGS. 1-3. At step 510, the method 500 includes receiving, at a client device, an input for a machine-learning model that is represented as the encrypted computational graph within a machine-learning runtime environment on the client device.

At step 520, the method 500 includes communicating an operational instruction associated with a first node of the encrypted computational graph to one or more trusted execution environments on the client device. The trusted execution environment could be hosted on a GPU, CPU, NPU or other processor. Different operational instructions may be handled by different types of trusted execution environments.

At step 530, the method 500 includes receiving an indication from a trusted execution environment indicating that the trusted execution environment is able to process the operational instruction. At step 540, the method 500 includes communicating the input and encrypted machine-learning content associated with the first node to the trusted execution environment. At step 550, the method 500 includes receiving, from the trusted execution environment, an output generated by executing computations instructed by the encrypted machine-learning content on the input. The output may form the input to one or more downstream nodes within the computational graph or correspond to a final model output.

FIG. 6 is a flow diagram showing a method 600 of using an encrypted computational graph, in accordance with some embodiments of the present disclosure. Method 600 may be performed on or with systems similar to those described with reference to FIGS. 1-3. At step 610, the method 600 includes receiving, at a trusted execution environment on a client device, an operational instruction associated with a first node of the encrypted computational graph operating in a machine-learning runtime environment on the client device. Different trusted execution environments may respond to different operational instructions. The trusted execution environment may be hosted by a GPU, CPU, NPU, or other type of processor.

At step 620, the method 600 includes providing, by the trusted execution environment, an indication indicating that the trusted execution environment is able to process the operational instruction.

At step 630, the method 600 includes receiving, at the trusted execution environment, a machine-learning input and encrypted machine-learning content associated with the first node. The encrypted machine-learning content may include model data, such as weights and bias data.

At step 640, the method 600 includes decrypting, at the trusted execution environment, the encrypted machine-learning content to form decrypted machine-learning content. The encrypted machine-learning content may have been encrypted using a public key previously provided by the TEE. This allows the TEE to decrypt the encrypted machine-learning content.

At step 650, the method 600 includes generating, at the trusted execution environment, an output by executing computations instructed by the decrypted machine-learning content on the machine-learning input. At step 660, the method 600 includes providing the output to the machine-learning runtime environment.

Example Operating Environment

Figure 7:
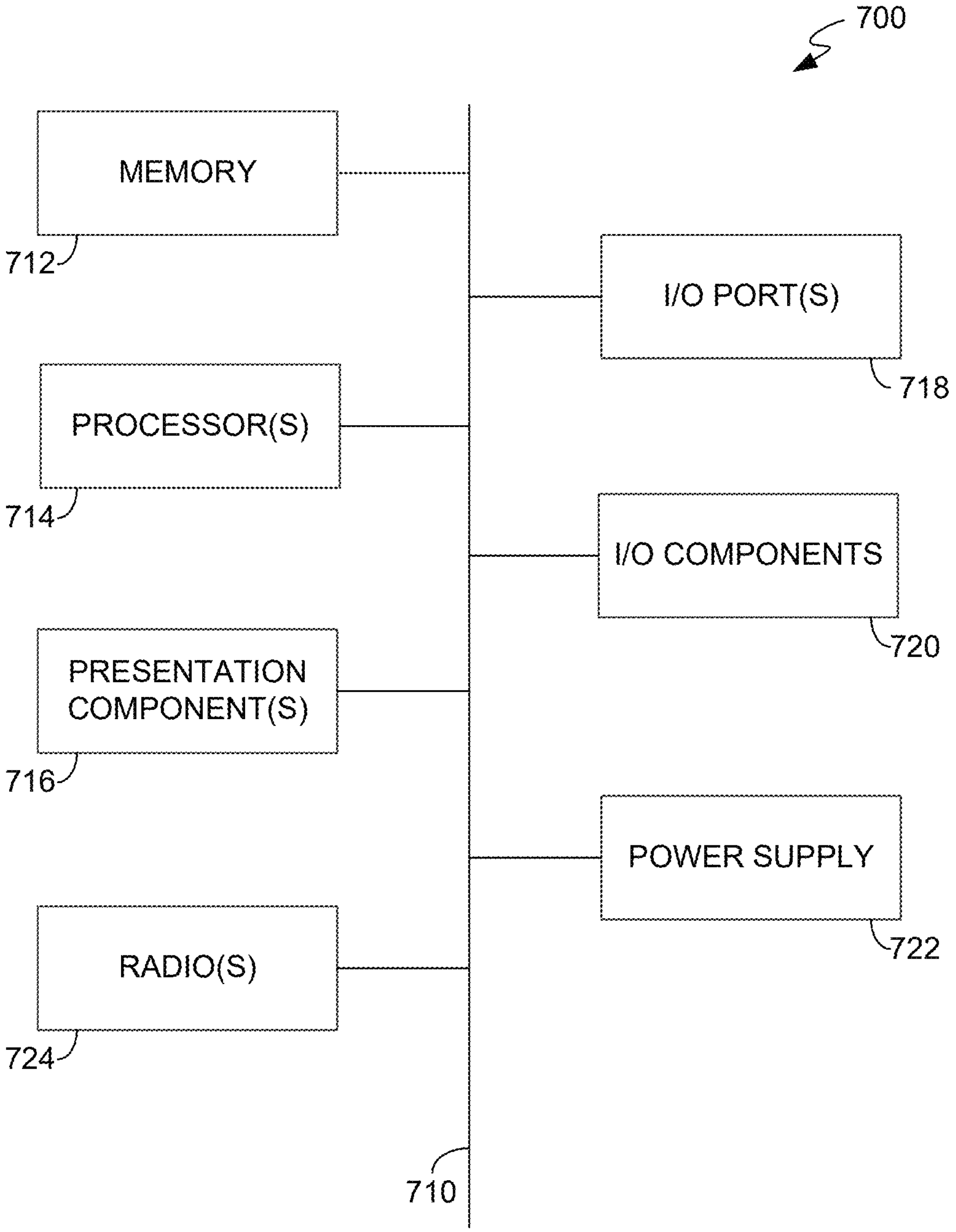
FIG. 7 is a block diagram showing a computing device suitable for implementations of the technology described herein.

Referring to the drawings in general, and initially to FIG. 7 in particular, an example operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of a computing device that may be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media may be any available media that may be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Example memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Example presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include a radio 724. The radio 724 transmits and receives radio communications. The computing device may be a wireless terminal adapted to receive communications and media over various wireless networks. Computing device 700 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

EMBODIMENTS

Embodiment 1. One or more computer storage media comprising computer-executable instructions that when executed by computing device performs a method of using an encrypted computational graph, the method comprising: identifying, at a deployment server, a plurality of operational instructions needed for a machine-learning runtime environment to execute a machine-learning model; communicating, to a client device, the plurality of operational instructions to the machine-learning runtime environment; receiving, from the machine-learning runtime environment on the client device, information associated with a trusted execution environment on the client device, wherein the information includes supported operational instructions for the trusted execution environment and an encryption key for the trusted execution environment; building the encrypted computational graph for execution by the machine-learning runtime environment using the supported operational instructions and the encryption key; and communicating the encrypted computational graph to the client device.

Embodiment 2. The media of embodiment 1, wherein the method further comprises: receiving a certificate for the trusted execution environment; and prior to building the encrypted computational graph, validating the certificate.

Embodiment 3. The media as in any one of the preceding embodiments, wherein the supported operational instructions describe machine-learning operations the trusted execution environment is capable of performing.

Embodiment 4. The media as in any one of the preceding embodiments, wherein the information also includes an amount of memory available within the trusted execution environment.

Embodiment 5. The media as in any one of the preceding embodiments, wherein a node in the encrypted computational graph includes a dedicated operational instruction that is dedicated to the trusted execution environment and encrypted machine-learning model data that is encrypted using the encryption key.

Embodiment 6. The media of embodiment 5, wherein the encryption key a public key wherein the less.

Embodiment 7. The media of embodiment 5, wherein the dedicated operational instruction is provided by the trusted execution environment.

Embodiment 8. The media as in any one of the preceding embodiments, where the trusted execution environment includes a portion of memory on a graphics processing unit on the client device.

Embodiment 9. A method of using an encrypted computational graph comprising: receiving, at a client device, an input for a machine-learning model that is represented as the encrypted computational graph within a machine-learning runtime environment on the client device; communicating an operational instruction associated with a first node of the encrypted computational graph to one or more trusted execution environments on the client device; receiving an indication from a trusted execution environment indicating that the trusted execution environment is able to process the operational instruction; communicating the input and encrypted machine-learning content associated with the first node to the trusted execution environment; and receiving, from the trusted execution environment, an output generated by executing computations instructed by the encrypted machine-learning content on the input.

Embodiment 10. The method of embodiment 9, wherein the operational instruction is dedicated to the trusted execution environment.

Embodiment 11. The method as in any one of embodiments 9 and 10, wherein the encrypted machine-learning content is encrypted using a public key provided by the trusted execution environment.

Embodiment 12. The method as in any one of embodiments 9, 10, and 11, wherein the encrypted machine-learning content includes learned weights for a large language model.

Embodiment 13. The method as in any one of embodiments 9, 10, 11, and 12, wherein the method further comprises: receiving, at the client device, a plurality of operational instructions needed for the machine-learning runtime environment to execute the machine-learning model; querying, at the client device, the trusted execution environment at a hardware layer of the client device to determine whether the plurality of operational instructions can be handled by the trusted execution environment; and providing information associated with the trusted execution environment to a deployment server, wherein the information includes supported operational instructions for the trusted execution environment and an encryption key for the trusted execution environment.

Embodiment 14. The method of embodiment 13, wherein the method further comprises receiving, at the client device, the encrypted computational graph from the deployment server.

Embodiment 15. The method of embodiment 13, wherein the information also includes an amount of memory available within the trusted execution environment.

Embodiment 16. A method using an encrypted computational graph, comprising: receiving, at a trusted execution environment on a client device, an operational instruction associated with a first node of the encrypted computational graph operating in a machine-learning runtime environment on the client device; providing, by the trusted execution environment, an indication indicating that the trusted execution environment is able to process the operational instruction; receiving, at the trusted execution environment, a machine-learning input and encrypted machine-learning content associated with the first node; decrypting, at the trusted execution environment, the encrypted machine-learning content to form decrypted machine-learning content; generating, at the trusted execution environment, an output by executing computations instructed by the decrypted machine-learning content on the machine-learning input; and providing the output to the machine-learning runtime environment.

Embodiment 17. The method of embodiment 16, where the operational instruction is associated with a node of the encrypted computational graph.

Embodiment 18. The method as in any one of embodiments 16 and 17, wherein the method further comprises receiving, at the trusted execution environment, a plurality of operational instructions needed for the machine-learning runtime environment to execute the machine-learning model.

Embodiment 19. The method of embodiment 18, wherein the method further comprise providing, by the trusted execution environment, a dedicated operational instruction for the operational instruction and an encryption key.

Embodiment 20. The method of embodiment 18, wherein the method further comprise providing, by the trusted execution environment, and amount of memory available to the trusted execution environment.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by computing device performs a method of using an encrypted computational graph, the method comprising:

identifying, at a deployment server, a plurality of operational instructions needed for a machine-learning runtime environment to execute a machine-learning model;

communicating, to a client device, the plurality of operational instructions to the machine-learning runtime environment;

receiving, from the machine-learning runtime environment on the client device, information associated with a trusted execution environment on the client device, wherein the information includes supported operational instructions for the trusted execution environment and an encryption key for the trusted execution environment;

building the encrypted computational graph for execution by the machine-learning runtime environment using the supported operational instructions and the encryption key, wherein the encrypted computational graph defines executable nodes each comprising encrypted model data and an operational instruction that the machine-learning runtime environment uses to cause execution of computations of the machine-learning model; and communicating the encrypted computational graph to the client device.

2. The media of claim 1, wherein the method further comprises:

receiving a certificate for the trusted execution environment; and prior to building the encrypted computational graph, validating the certificate.

3. The media of claim 1, wherein the supported operational instructions describe machine-learning operations the trusted execution environment is capable of performing.

4. The media of claim 1, wherein the information also includes an amount of memory available within the trusted execution environment.

5. The media of claim 1, wherein a node in the encrypted computational graph includes a dedicated operational instruction that is dedicated to the trusted execution environment and encrypted machine-learning model data that is encrypted using the encryption key.

6. The media of claim 1, wherein the encrypted computational graph controls ordering and execution of computations of the machine-learning model.

7. The media of claim 5, wherein the dedicated operational instruction is provided by the trusted execution environment.

8. The media of claim 1, wherein the trusted execution environment includes a portion of memory on a graphics processing unit on the client device.

9. A method of using an encrypted computational graph comprising:

receiving, at a client device, an input for a machine-learning model that is represented as the encrypted computational graph within a machine-learning runtime environment on the client device, wherein the encrypted computational graph defines executable nodes each comprising encrypted model data and an operational instruction that the machine-learning runtime environment uses to cause execution of computations of the machine-learning model;

communicating an operational instruction associated with a first node of the encrypted computational graph to one or more trusted execution environments on the client device;

receiving an indication from a trusted execution environment indicating that the trusted execution environment is able to process the operational instruction;

communicating the input and encrypted machine-learning content associated with the first node to the trusted execution environment; and receiving, from the trusted execution environment, an output generated by executing computations instructed by the encrypted machine-learning content on the input.

10. The method of claim 9, wherein the operational instruction is dedicated to the trusted execution environment.

11. The method of claim 9, wherein the encrypted machine-learning content is encrypted using a public key provided by the trusted execution environment.

12. The method of claim 9, wherein the encrypted machine-learning content includes learned weights for a large language model.

13. The method of claim 9, wherein the method further comprises:

receiving, at the client device, a plurality of operational instructions needed for the machine-learning runtime environment to execute the machine-learning model;

querying, at the client device, the trusted execution environment at a hardware layer of the client device to determine whether the plurality of operational instructions can be handled by the trusted execution environment; and providing information associated with the trusted execution environment to a deployment server, wherein the information includes supported operational instructions for the trusted execution environment and an encryption key for the trusted execution environment.

14. The method of claim 13, wherein the method further comprises receiving, at the client device, the encrypted computational graph from the deployment server.

15. The method of claim 13, wherein the information also includes an amount of memory available within the trusted execution environment.

16. A method of using an encrypted computational graph, the method comprising:

identifying, at a deployment server, a plurality of operational instructions needed for a machine-learning runtime environment to execute a machine-learning model;

communicating, to a client device, the plurality of operational instructions to the machine-learning runtime environment;

receiving, from the machine-learning runtime environment on the client device, information associated with a trusted execution environment on the client device, wherein the information includes supported operational instructions for the trusted execution environment and an encryption key for the trusted execution environment, wherein the supported operational instructions describe machine-learning operations the trusted execution environment is capable of performing;

building the encrypted computational graph for execution by the machine-learning runtime environment using the supported operational instructions and the encryption key, wherein the encrypted computational graph defines executable nodes each comprising encrypted model data and an operational instruction that the machine-learning runtime environment uses to cause execution of computations of the machine-learning model; and communicating the encrypted computational graph to the client device.

17. The method of claim 16, wherein the method further comprises:

receiving a certificate for the trusted execution environment; and prior to building the encrypted computational graph, validating the certificate.

18. The method of claim 16, wherein the information also includes an amount of memory available within the trusted execution environment.

19. The method of claim 16, wherein a node in the encrypted computational graph includes a dedicated operational instruction that is dedicated to the trusted execution environment and encrypted machine-learning model data that is encrypted using the encryption key.

20. The method of claim 16, wherein the dedicated operational instruction is provided by the trusted execution environment.

* * * * *